Oct. 8, 1935.   H. NUTT ET AL   2,016,451
FRICTION CLUTCH
Filed Dec. 2, 1932
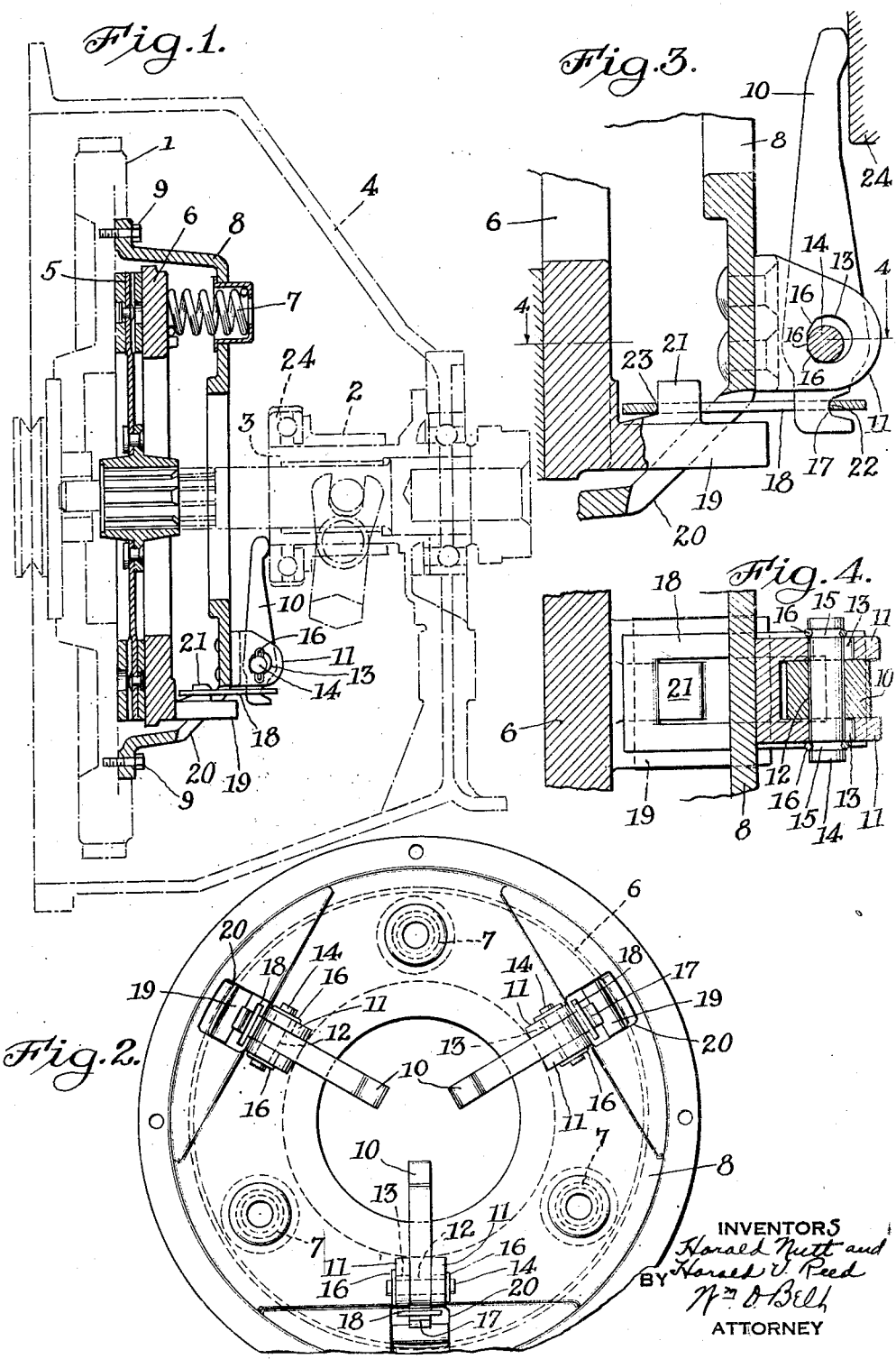
INVENTORS
Harold Nutt and
BY Harold V. Reed
Wm O Bell
ATTORNEY Patented Oct. 8, 1935

2,016,451

UNITED STATES PATENT OFFICE 2,016,451

FRICTION CLUTCH

Harold Nutt and Harold V. Reed, Chicago, Ill., assignors, by mesne assignments, to Borg-Warner Corporation, Chicago, Ill., a corporation of Illinois Application December 2, 1932, Serial No. 645,394

4 Claims. (Cl. 192—68)

This invention relates to friction clutches and it is particularly useful in that type of clutch which is employed in connection with the power plant of an automotive vehicle. Modern traffic, traveling and other conditions require that the clutch of an automotive vehicle should be operated more frequently than has been the practice in the past and this condition has naturally resulted in an increase of wear on the rubbing parts of the clutch which, in turn, has resulted in an increase of friction between the rubbing parts to such an extent that the force required to release the clutch is appreciably greater than formerly.

The primary object of this invention is to improve the action and thereby increase the efficiency of a friction clutch by reducing the friction between its moving parts.

And a further object of the invention is to mount the clutch levers and connect them for operating the pressure ring in a simple and novel manner which will reduce the friction between the parts to a minimum.

We have illustrated a selected embodiment of the invention in the accompanying drawing in which Fig. 1 is a vertical central sectional view showing a clutch embodying the invention, the housing and some other parts being shown in broken lines.

Fig. 2 is a an elevation of the clutch partly broken away.

Fig. 3 is an enlarged detail sectional view showing one of the lever units of the clutch.

Fig. 4 is a detail sectional view on the line 4—4 of Fig. 3.

Referring to the drawing, 1 is a flywheel rigidly mounted on a driving shaft (not shown) and 2 is a clutch release device operating on the sleeve 3 and within a housing 4. A clutch plate 5 is rigidly mounted on the driven shaft and is clamped by a pressure ring 6 and springs 7 against the flywheel 1 whereby to impart motion from the driving shaft and flywheel through the clutch plate to the driven shaft. A cover 8 is fastened to the flywheel by bolts 9 and clutch levers 10 are pivotally mounted in lugs 11 on the outer side of the cover. The clutch levers are adapted to be operated by the clutch release device 2 to retract the pressure plate against the tension of the springs 7. The invention may be used with clutch plates of different kinds and any suitable number of lever units may be provided.

The clutch lever is arranged between a pair of lugs 11 and the lever has an opening 12 and the lugs have enlarged openings 13 to receive the pivot pin 14. The pivot pin may be secured in the lever with a drive fit or it may be loose in the lever and in either case we secure the pin against displacement by extending it beyond the lugs and providing it with grooves 15 to receive retaining clips 16. The openings 13 in the lugs are larger in size than the pivot pin and one portion of the wall of each of said openings constitutes a bearing for the pivot pin. In order that the pivot pin may roll, instead of rub, on its bearing, we make the bearing non-concentric with the pivot pin and for this purpose we prefer to make the bearing by forming the wall of the enlarged openings in the lugs with flats 16 upon which the pivot pin rolls when the lever is operated.

The outer end of the lever is provided with a socket 17 to receive a link 18 and the pressure ring 6 has a boss 19 which projects through an opening 20 in the cover and is provided with a lug 21 with which the link is also engaged. The edge 22 of the link which engages the socket 17 is rounded and the engaging face of the socket is also rounded but on a considerably longer radius so that there will be a rolling contact and not a rubbing contact between the link and the lever in the movement of the lever; and the edge 23 of the link which engages the lug 21 is also rounded and the contact face of the lug is flat so that there will be a rolling contact and not a rubbing contact between the link and the pressure plate.

When the clutch release bearing 24 is operated, to the left in Figs. 1 and 3, by the clutch release device, the clutch levers will be oscillated on their pivots and, through the links, will withdraw the pressure ring against the tension of the springs 7 to release the clutch. The pivot pins of the levers move with a rolling action, instead of a rubbing action, on the bearings in the enlarged openings of the supporting lugs and the links will have a slight swinging movement with a rolling action in contact with the levers and the lugs on the pressure ring whereby friction between the contacting parts is reduced to a minimum and practically eliminated, and wear on the parts is correspondingly reduced and practically eliminated.

We have shown and described the invention in one form and in one type of automotive clutch but it may be embodied in other forms and in other types of clutches and we reserve the right to make all such changes and modifications as may be necessary or desirable for these purposes, within the scope of the following claims:—

We claim:

1. A friction clutch comprising a pressure ring, a lever, a link connecting the pressure ring and lever whereby the ring may be operated by the lever, and means comprising a large radius socket on the lever and small radius edges on the link and a flat contact face on the pressure ring for providing a rolling action between the contacts of the link and the pressure ring and lever.

2. A friction clutch comprising a pressure ring, a support, a lever pivotally mounted in the support, a link connecting the pressure ring and lever whereby the ring may be operated by the lever, and means providing a rolling action for the pivot of the lever.

3. A friction clutch comprising a pressure ring, a support, a lever pivotally mounted in the support, a link connecting the pressure ring and lever whereby the ring may be operated by the lever, and means providing a rolling action for the pivot of the lever and at the contacts of the link with the pressure ring and lever.

4. A friction clutch comprising a pressure ring, a support, a lever having a convex pivot mounted in said support, a link connecting the pressure ring and lever whereby the ring may be operated by the lever, and means providing a rolling action for the pivot of the lever and at the contacts of the link with the pressure ring and lever.

HAROLD NUTT.
HAROLD V. REED.